United States Patent [19]

Ovsborn et al.

[11] Patent Number: 4,961,304
[45] Date of Patent: Oct. 9, 1990

[54] COTTON FLOW MONITORING SYSTEM FOR A COTTON HARVESTER

[75] Inventors: Jesse H. Ovsborn, Hinsdale; Robert W. Hahn, Lemont, both of Ill.

[73] Assignee: J. I. Case Company, Racine, Wis.

[21] Appl. No.: 424,393

[22] Filed: Oct. 20, 1989

[51] Int. Cl.⁵ ...................... A01D 45/18; G08B 21/00
[52] U.S. Cl. ............................. 56/10.2; 56/DIG. 15; 340/684; 460/1
[58] Field of Search ............... 56/10.1, 10.2, DIG. 15; 460/1, 4; 340/684, 603, 612, 615

[56] References Cited

U.S. PATENT DOCUMENTS

| | | | |
|---|---|---|---|
| 3,515,144 | 6/1970 | Morrison | 460/4 |
| 3,593,720 | 7/1971 | Botterill et al. | 56/DIG. 15 |
| 3,606,745 | 9/1971 | Girodat | 460/4 X |
| 3,610,252 | 10/1971 | De Coene et al. | 56/DIG. 15 X |
| 3,638,659 | 2/1972 | Dahlquist et al. | 460/1 |
| 3,935,866 | 2/1976 | Northup et al. | 130/24 |
| 4,068,223 | 1/1978 | Steffen | 56/10.2 X |
| 4,230,130 | 10/1980 | Staiert | 56/10.2 X |
| 4,286,424 | 9/1981 | Hubbard | 56/10.2 |
| 4,635,047 | 1/1987 | Fox et al. | 56/10.2 |
| 4,733,355 | 3/1988 | Davidson et al. | 56/10.2 |
| 4,744,207 | 5/1988 | Hanley et al. | 56/10.2 X |
| 4,765,190 | 8/1988 | Strybbe | 56/10.2 X |
| 4,902,264 | 2/1990 | Diekhans et al. | 56/10.2 X |

Primary Examiner—Thuy M. Bui
Attorney, Agent, or Firm—Dressler, Goldsmith, Shore, Sutker & Milnamow

[57] ABSTRACT

A system for monitoring cotton flow through a conveying system of a cotton harvester. The monitoring system includes acoustic sensors for generating pulses or signals as a function of sound produced from cotton impinging upon a walled conveying duct of the conveying system. The sensors are connected to detector circuitry which provides a first signal condition when cotton flow through the duct is above a first level and a second signal condition when cotton flow is below the first level. The system of the present invention further includes an alarm which is responsive to outputs from the detector circuitry.

13 Claims, 1 Drawing Sheet

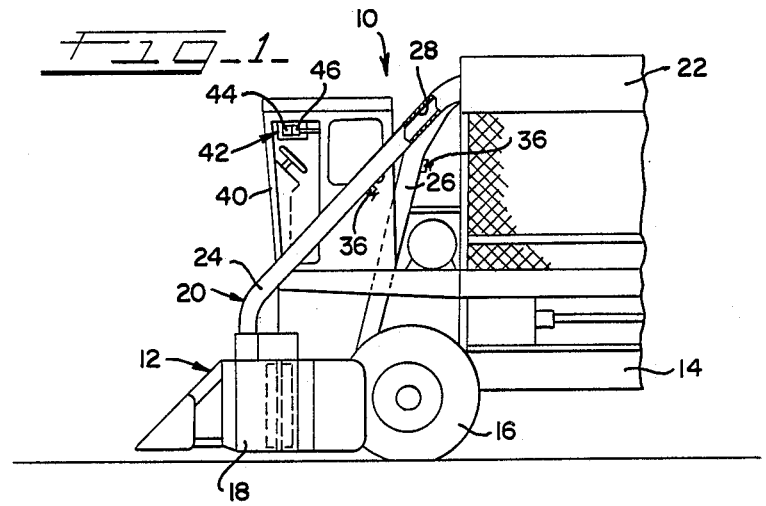
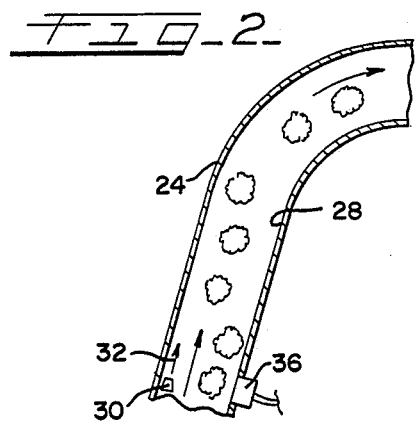
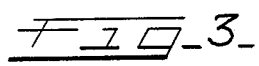
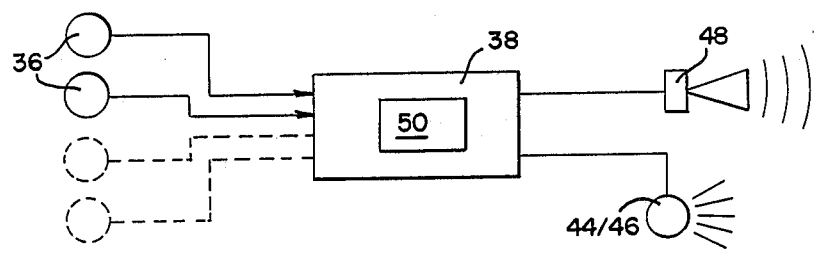

COTTON FLOW MONITORING SYSTEM FOR A COTTON HARVESTER

FIELD OF THE INVENTION

The present invention generally relates to cotton harvesters and, more particularly, to a system for monitoring cotton flow through a conveying system of the cotton harvester.

BACKGROUND OF THE INVENTION

Cotton harvesters typically include two or more cotton harvesting units arranged at a forward end of a frame for removing cotton from rows of cotton plants. Each harvesting unit has a pair of picker drums including vertically spaced rows of rotary picker spindles for removing the cotton from the plants.

A cotton-conveying system transports the harvested cotton from the harvesting unit to a receptacle mounted on the frame of the cotton harvester. The conveying system includes walled ducts extending upwardly from the harvesting units toward the receptacle and air jets for drawing the harvested cotton from the harvesting units and propelling the cotton through the ducts.

For one reason or another, the harvested cotton may clog the duct through which it travels en route to the receptacle and stop the flow of cotton from the cotton plants to the receptacle. Should a blockage or clog result, the operator would not know of the blockage until he observes that no cotton is passing through the outlet of the duct. This may be difficult to detect, as many large automatic cotton pickers are provided with several ducts through which the cotton flows en route to the receptacle. Therefore, should one of the ducts become blocked or clogged, it may be difficult to detect since cotton is still coming out of the other ducts.

Various types of monitoring systems have been devised to detect blockages in cotton harvesters which have air conveying systems for moving harvested cotton from the harvesting units to the cotton receptacle. One type of monitoring system includes a photoelectric detector which is responsive to cotton flow through the duct. Photoelectric detectors, however, are susceptible to dirt, grease, water and plant saps carried by the harvested cotton conveyed therepast and which clouds the face of the detector.

Thermistors and thermocouple sensors are known for monitoring airflow in a duct. The thermistor or thermocouple-type sensors are sensitive and require relative complex circuitry which must be carefully calibrated to achieve accurate results. Monitoring systems which use pressure-responsive monitors or sensors are also expensive and are also difficult to calibrate.

SUMMARY OF THE INVENTION

In view of the above, and in accordance with the present invention, there is provided a cotton flow monitoring system for a cotton harvester. The system of the present invention relies on a unique sound created by the harvested cotton as it is propelled through a duct on its way to a receptacle.

The cotton picked from the plants includes seeds. Typically, each boll of cotton will include 30 to 40 seeds. A salient feature of the present invention is an appreciation that such seeds produce a distinctive sound or signature when they impinge upon walls of the cotton conveying duct as they pass toward the receptacle. The sound produced by the cotton seeds impinging upon the walled structure is unique and similar to sleet or small hail on a tin roof. As will be appreciated, the rate with which the cotton seeds strike against the walled duct provides a relative indication of the amount of cotton flowing therethrough.

The monitoring system of the present invention includes an acoustic sensor arranged along the length of the duct for monitoring cotton flow through the duct as a function of the sound created by the cotton impinging upon the duct. The monitoring system of the present invention further includes detector circuitry connected to the acoustic sensor for providing a signal to the operator of the harvester indicative of cotton flow through the duct.

In a preferred form, the acoustic sensor includes an electrical transducer mounted toward an upper end of the duct for generating pulses or a flow rate signal which is a function of the sound produced from the cotton impinging upon the walls of the duct. The detector circuitry provides a first signal condition when the cotton flow rate signals received from said sensor over a predetermined time are above a first level and a second signal condition when the cotton flow rate signals received from the sensor over the predetermined time are below the first level.

The monitoring system of the present invention may further include an alarm for alerting the operator of the harvester to a blocked condition in the cotton conveying duct. The alarm may provide an audible and/or a visual indication to the operator of the cotton harvester that a problem exists.

As will be appreciated, and for myriad reasons, the cotton yield in different areas or sections of a plant row may be sparse. To promote efficient operation, the system of the present invention includes a predetermined time delay before a blockage is signalled. Accordingly, "skip" problems in a row or crop yield variations will not interfere with proper operation of the present invention.

To facilitate an increase in productivity, some cotton harvesters include four or more harvesting units arranged at the forward end of the cotton harvester. In a preferred form, each cotton harvesting unit is provided with a duct for directing harvested cotton toward the receptacle.

With the present invention, each duct of the cotton harvester is provided with an acoustic sensor producing a flow rate signal in response to the sound produced from the harvested cotton impinging upon the walls of the duct as the harvested cotton is propelled therethrough. The detector circuitry receives and compares the flow rate signals from each of the acoustic sensors. The detector circuitry provides a first signal condition when the comparison of the flow rate signals is within a predetermined range and provides a second signal condition when the comparison of the flow rate signals is beyond the predetermined range. Such monitoring system may further include an indicator connected to the detector circuitry for providing an indication of the condition of such circuitry.

The monitoring system of the present invention provides an efficient and cost-effective solution to the problem of detecting or monitoring cotton rate flow in a duct of a cotton harvester. Moreover, the monitoring system of the present invention is less prone to false signals due to buildup of cotton within the conveying system and, therefore, is more reliable than other known systems. The acoustic sensors used to monitor cotton flow are readily mounted on the conveying ducts without interfering with cotton flow and are relatively inexpensive.

Numerous other features and advantages of the present invention will become apparent from the following detailed description, the accompanying drawings, and the appended claims.

BRIEF DESCRIPTION OF THE DRAWINGS

FIG. 1 is a side view of a front portion of a cotton harvester with the monitoring system of the present invention attached thereto;

FIG. 2 is a longitudinal sectional view of a duct included within the cotton conveying system of the present invention; and FIG. 3 schematically illustrates further details of the monitoring system of the present invention.

DETAILED DESCRIPTION OF THE DRAWINGS

While the present invention is susceptible of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings, wherein like reference numerals indicate like parts throughout the several views, there is shown in FIG. 1 a cotton harvester 10 wherein a monitoring system embodying principles of the present invention is advantageously used. The cotton harvester 10 includes a plurality of cotton harvesting units 12 arranged at a forward end of a frame 14 for removing cotton from plants as the harvester moves forwardly over the field on wheels 16.

Each harvesting unit 12 includes an upright housing 18, forward and rear picker drums (not shown) for removing cotton from the plants, and doffer assemblies (not shown) for removing the cotton from the forward and rear picker drums. A cotton conveying system 20 is provided for directing the harvested cotton from each harvesting unit to a cotton receiving receptacle 22 mounted on the frame 14 of the cotton harvester.

As illustrated, the cotton conveying system 20 includes walled ducts 24 and 26 associated with each harvesting unit. Each duct is preferably formed from sheet metal or the like and defines a passageway 28 which extends between the respective harvesting unit and the receptacle 22.

As illustrated in FIG. 2, a conventional air nozzle 30 or other suitable device introduces an upwardly directed jet of air 32 into a lower end of each passage 28 of each duct. The air nozzle 30 is preferably supported by the duct. In operation, the upwardly directed jet of air expelled from nozzle 30 directs cotton from the harvesting unit into the duct and propels the harvested cotton upwardly through the duct and, ultimately, into the receptacle 22.

Turning to FIG. 3, a monitoring system according to the present invention includes a plurality of acoustic sensors 36, with one sensor being associated with each duct of the cotton harvesting units. Detector circuitry 38 is configured to receive signals from each of the acoustic sensors 36 and provide a signal to the operator of the harvester indicative of the cotton flow through the ducts.

In a preferred form, each sensor 36 is an electric transducer such as a piezoelectric element which is mounted along and toward an upper end of each duct. As may be appreciated, the sensor 36 may be located within, upon, or closely proximate to the duct with which it is associated. The sensor 36 detects the vibrations caused by the impact of the cotton seeds in the harvested cotton striking the walls of the duct and generates a flow rate signal or pulse which is a function of the sound produced from the cotton impinging upon the walls of the duct as the cotton is propelled therethrough. A piezoelectric element of the type manufactured by Pennwalt Corporation and sold as Kynar piezofilm is one example of a sensor which readily lends itself to the present invention.

The pulses produced by the sensors are delivered to and received by the detector circuitry 38. The detector circuitry 38 may be formed as an integral part of or separate from the sensors 36. The detector circuitry 38 provides a first signal condition when the cotton flow rate signals received from the sensor 36 over a predetermined time are above a first level and a second signal condition when cotton flow rate signals received from said sensors over said predetermined time are below the first level. In those cotton harvester embodiments wherein more than one harvesting unit is utilized, the detector circuitry 38 receives and compares the flow rate signals from the various sensors. The detector circuitry 38 provides a first signal condition when the comparison of the flow rate signals is within a predetermined range and provides a second signal condition when the comparison of the flow rate signals is beyond the predetermined range.

In the illustrated embodiment, the cotton harvester 10 further includes a cab portion 40 which contains the controls for operation of the cotton harvester. Furthermore, a console panel 42 is mounted within the cab portion 40 to be in easy view and reach of the operator as seen in FIG. 1 of the drawings. The console 42 may include an alarm system comprised of a plurality of indicating lights 44 and 46, each corresponding to a particular function being monitored within the monitor system. For example, the console may include a plurality of indicating lights for the various ducts of the cotton conveying system. Alternatively, the console may also include an audible alarm 48 (FIG. 3) which is energized to attract the attention of the operator, should any of the indicating lights not operate properly.

As will be appreciated, the cotton or crop yield in different areas or sections of a plant row may be sparse. To promote efficient operation of the present invention, the detector circuitry 38 may further include means 50 for delaying an indication of the cotton flow through the duct to provide for such yield variations of the cotton plants. This will minimize "skip" problems in the row and provide for crop yield variations. Long skips will be accepted as failed signals. The detector circuitry 38 will be programmed such that if all sensors 36 produce signals indicative of a similar condition, the circuitry 38 will not trip the alarm. Such programming eliminates false signals at the ends of the rows of the cotton plants.

During normal operation, the sensors 36 detect and generate a flow rate signal in response to vibration caused by the impact of the cotton seeds in the harvested cotton striking the walls of the ducts. The vibrations caused by the cotton seeds striking the ducts can be characterized and appropriate detector circuitry 38 determines if a valid seed strike has occurred and an appropriate signal is generated thereby. The rate of seed strikes gives a relative indication of the amount of cotton flowing through each of the ducts.

Under normal harvesting operations, cotton flow through corresponding ducts should be substantially equal. Each of the sensors, therefore, should have similar strike rates. Differences in strike rates, of course, will be indicative of a plugged or blocked conveying duct. Accordingly, if there is a significant difference in the strike rates, the operator is alerted to such significant difference. By comparing the outputs of the sensors, crop yield variations and end-of-row conditions will not give false alarms.

When the detector circuitry detects a blockage in any of the ducts, an alarm, visual and/or audible, is provided to the operator. By alerting the operator, the blockage or clog may be timely removed and, more importantly, avoid damage to the cotton harvester as a result thereof.

From the foregoing, it will be observed that numerous modifications and variations can be effected without departing from the true spirit and scope of the novel concept of the present invention. It will be appreciated that the present disclosure is intended to set forth an exemplification of the invention which is not intended to limit the invention to the specific embodiments illustrated. The disclosure is intended to cover by the appended claims all such modifications as fall within the scope of the claims.

What is claimed is:

1. In a cotton harvester having a harvesting unit for removing cotton from plants, a walled duct extending from the harvesting unit, means for directing cotton from the harvesting unit into the duct and propelling the cotton through the duct, and a cotton flow monitoring system comprising:
   acoustic means arranged along said duct for generating an output as a function of the sound created by the cotton impinging upon said duct; and
   means for providing a signal to an operator of the harvester in response to the output received from said acoustic means to indicate cotton flow through said duct.

2. The cotton harvester according to claim 1, wherein said acoustic means comprises an electrical transducer which generates pulses when cotton impinges against the walls of said duct.

3. The cotton harvester according to claim 1, wherein said signal providing means produces a visual indication to the operator of the cotton flow through said duct.

4. The cotton harvester according to claim 1, wherein said signal providing means produces an audible indication to the operator of the cotton flowing through the duct.

5. The cotton harvester according to claim 1, wherein said signal providing means includes means for delaying an indication of the cotton flow through said duct to provide for crop yield variations of the cotton plants.

6. In a cotton harvester having a harvesting unit for removing cotton from plants, a walled duct extending from the harvesting unit, means for drawing the cotton removed from the plant by the harvesting unit into the duct and propelling the cotton through the duct, and a cotton flow monitoring system comprising:
   acoustic sensor means positioned at a preselected location along the duct for generating a flow rate signal which is a function of a sound produced from the cotton impinging upon the walls of the duct as said cotton is propelled therethrough; and
   detector means for providing a first signal condition when the cotton flow rate signals received from said sensor means over a predetermined time are above a first level and a second signal condition when the cotton flow rate signals received from said sensor means over said predetermined time are below said first level.

7. The cotton harvester according to claim 6, wherein said sensor means comprises an electrical transducer positioned at an upper end of said duct for producing pulses in response to cotton impinging upon the walled ducts.

8. The cotton harvester according to claim 6, wherein said means for providing signal conditions includes an alarm for alerting the operator of the harvester to cotton flow through the duct.

9. The cotton harvester according to claim 6, wherein said means for providing signal conditions includes means for delaying provision of said second signal condition to provide for crop yield variations of the cotton plants.

10. In a cotton harvester having a plurality of harvesting units for removing cotton from plants, a receptacle for receiving harvested cotton, each harvesting unit having a walled duct extending between the harvesting unit and the receptacle and an air jet for introducing air into the duct to draw harvested cotton from the harvesting unit and propel the harvested cotton through the duct, and a cotton flow monitoring system comprising:
   acoustic sensor means arranged in combination with each duct leading from said harvesting units, each sensor means producing a flow rate signal in response to sound produced from the harvested cotton impinging upon the walls of the duct as said harvested cotton is propelled therethrough; and
   operative means for receiving and comparing the flow rate signals from said sensor means, said operative means providing a first signal condition when the comparison of said flow rate signals is within a predetermined range and for providing a second signal condition when the comparison of said flow rate signals is beyond said predetermined range.

11. The cotton harvester according to claim 10, wherein said monitoring system further includes indicator means connected to said operative means for providing an indication of the condition of said operative means.

12. The cotton harvester according to claim 10, wherein each sensor means comprises an electrical transducer which produces a pulse in response to the impingement of cotton against a walled duct.

13. The cotton harvester according to claim 10, wherein said operative means includes means for delaying the provision of said second signal condition to allow for crop yield variations of the cotton plants.

* * * * *

UNITED STATES PATENT AND TRADEMARK OFFICE
CERTIFICATE OF CORRECTION

PATENT NO. : 4,961,304

DATED : October 9, 1990

INVENTOR(S) : Jesse H. Orsborn and Robert W. Hahn

It is certified that error appears in the above-identified patent and that said Letters Patent is hereby corrected as shown below:

ON TITLE PAGE:

Page 1, bibliographic data, INID Code [75] "Jesse H. Ovsborn" should be -- Jesse H. Orsborn --; and Column 3, lines 20 and 21, "DETAILED DESCRIPTION OF THE DRAWINGS" should be -- *Detailed Description of a Preferred Embodiment* --.

Signed and Sealed this

Fourteenth Day of January, 1992

Attest:

HARRY F. MANBECK, JR.

Attesting Officer

Commissioner of Patents and Trademarks